US009123342B2

(12) United States Patent
Chen et al.

(10) Patent No.: US 9,123,342 B2
(45) Date of Patent: Sep. 1, 2015

(54) METHOD OF RECOGNIZING GENDER OR AGE OF A SPEAKER ACCORDING TO SPEECH EMOTION OR AROUSAL

(75) Inventors: Oscal Tzyh-Chiang Chen, Chia-Yi County (TW); Ping-Tsung Lu, Chia-Yi County (TW); Jia-You Ke, Chia-Yi County (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 304 days.

(21) Appl. No.: 13/560,596

(22) Filed: Jul. 27, 2012

(65) Prior Publication Data
US 2013/0268273 A1    Oct. 10, 2013

(30) Foreign Application Priority Data
Apr. 10, 2012   (TW) .............................. 101112660 A

(51) Int. Cl.
*G10L 21/00*     (2013.01)
*G10L 25/00*     (2013.01)
*G10L 17/26*     (2013.01)
*G10L 25/63*     (2013.01)

(52) U.S. Cl.
CPC *G10L 17/26* (2013.01); *G10L 25/63* (2013.01)

(58) Field of Classification Search
CPC .............................. G10L 15/265; G10L 17/26
USPC .................. 704/231, 243, 246, 249, 250, 270
See application file for complete search history.

(56) References Cited

U.S. PATENT DOCUMENTS

| 5,623,609 | A  | * | 4/1997  | Kaye et al. ........................ 704/1 |
| 5,953,701 | A  |   | 9/1999  | Neti |
| 6,353,810 | B1 | * | 3/2002  | Petrushin ...................... 704/236 |
| 7,222,075 | B2 | * | 5/2007  | Petrushin ...................... 704/270 |
| 7,321,854 | B2 | * | 1/2008  | Sharma et al. ................ 704/243 |
| 7,729,914 | B2 | * | 6/2010  | Tato et al. ...................... 704/270 |
| 7,860,705 | B2 | * | 12/2010 | Afify et al. ........................ 704/3 |
| 7,881,933 | B2 |   | 2/2011  | Witzman |
| 7,881,934 | B2 | * | 2/2011  | Endo et al. .................... 704/251 |
| 2002/0194002 | A1 | * | 12/2002 | Petrushin ...................... 704/270 |
| 2007/0203698 | A1 | * | 8/2007  | Mapes-Riordan et al. ... 704/231 |
| 2008/0103761 | A1 | * | 5/2008  | Printz et al. ...................... 704/9 |
| 2008/0147397 | A1 | * | 6/2008  | Konig et al. .................. 704/246 |
| 2008/0155472 | A1 | * | 6/2008  | Runge et al. .................. 715/811 |
| 2010/0036660 | A1 | * | 2/2010  | Bennett ........................ 704/231 |
| 2010/0088088 | A1 | * | 4/2010  | Bollano et al. ............... 704/201 |
| 2010/0198598 | A1 | * | 8/2010  | Herbig et al. ................. 704/240 |
| 2011/0022395 | A1 | * | 1/2011  | Konchitsky et al. .......... 704/270 |

\* cited by examiner

*Primary Examiner* — Shaun Roberts
(74) *Attorney, Agent, or Firm* — Muncy, Geissler, Olds & Lowe, P.C.

(57) ABSTRACT

A method of recognizing gender or age of a speaker according to speech emotion or arousal includes the following steps of A) segmentalizing speech signals into a plurality of speech segments; B) fetching the first speech segment from the plural speech segments to further acquire at least one of emotional features or arousal degree in the speech segment; C) determining whether at least one of the emotional feature and the arousal degree conforms to some condition; if yes, proceed to the step D); if no, return to the step B) and then fetch the next speech segment; D) fetching the feature indicative of gender or age from the speech segment to further acquire at least one feature parameter; and E) recognizing the at least one feature parameter to further determine the gender or age of the speaker at the currently-processed speech segment.

13 Claims, 3 Drawing Sheets

METHOD OF RECOGNIZING GENDER OR AGE OF A SPEAKER ACCORDING TO SPEECH EMOTION OR AROUSAL

BACKGROUND OF THE INVENTION

1. Field of the Invention

The present invention relates generally to the technology of classification of gender or age of a speaker, and more particularly to a method of recognizing gender or age of a speaker according to speech emotion or arousal.

2. Description of the Related Art

Identification based on human biometrics has become recent developing tendency. Compared with this technology, the conventional person verification based on integrated circuit (IC) cards or passwords may have the risks that IC cards are missing or passwords are stolen. As far as the commercial fingerprint-based identification is concerned, the resolution of the device based on such technology affects accuracy of the recognition, considering the contact and hygiene that a user needs to touch the sensor of the device, so it is still limited in operation. Analyzing personal biometrics, such as recognition of emotion, gender, and age, by means of voices and faces can provide higher convenience and more options for recognition and reduce the aforesaid risks.

U.S. Pat. No. 7,881,933 B2 disclosed a speech processing technology, which could recognize a speaker's age according to received speech signals via a signal processing instrument to figure out a confidence score, which indicated the result of age recognition.

U.S. Pat. No. 5,953,701 disclosed a gender recognition system, in which a preprocessor converted speech signals into acoustic data, the phone state model created and stored in the memory beforehand was employed for processing, analyzing, and determining the relevant phonetic state, and finally the result of gender recognition was yielded.

As known from above, the existing speech processing technology can recognize age and gender. However, most of speech information contains speaker's emotion or arousal. As the emotion or the arousal is different at the moment of speaking, the speech signals indicate different physical characteristics, so the result of the recognition is variable subject to different emotional modes or arousal degree. To date, none of any existing techniques can classify emotional conditions or analyze the arousal degree for recognition of age and gender by reference to the emotion or arousal in speech signals as auxiliary.

SUMMARY OF THE INVENTION

The primary objective of the present invention is to provide a method that can recognize gender or age of a speaker according to the emotion or arousal in speech signals.

The foregoing objective of the present invention is attained by the method including the following steps of A) segmentalizing speech signals into a plurality of speech segments; B) fetching the first speech segment from the plural speech segments to further acquire at least one of emotional feature or arousal degree in the speech segment; C) determining at least one of the emotional feature or arousal degree of the first speech segment; if the emotional feature is the object for determination, determine whether the emotional feature belongs to a specific emotion; if the arousal degree is the object for determination, determine whether the arousal degree is greater or less than a threshold; if at least one of the abovementioned two cases is yes, proceed to the step D); if none of the abovementioned two cases is yes, return to the step B) and then fetch the next speech segment; D) fetching the features of gender or age from the speech segment to further acquire at least one feature parameter corresponding to gender or age; and E) performing the recognition based on the at least one feature parameter according to a gender-dependent or age-dependent recognition measure to further determine the speaker's gender or age; next, apply the step B) to the next speech segment.

DETAILED DESCRIPTION OF PREFERRED EMBODIMENTS

Figure 1:
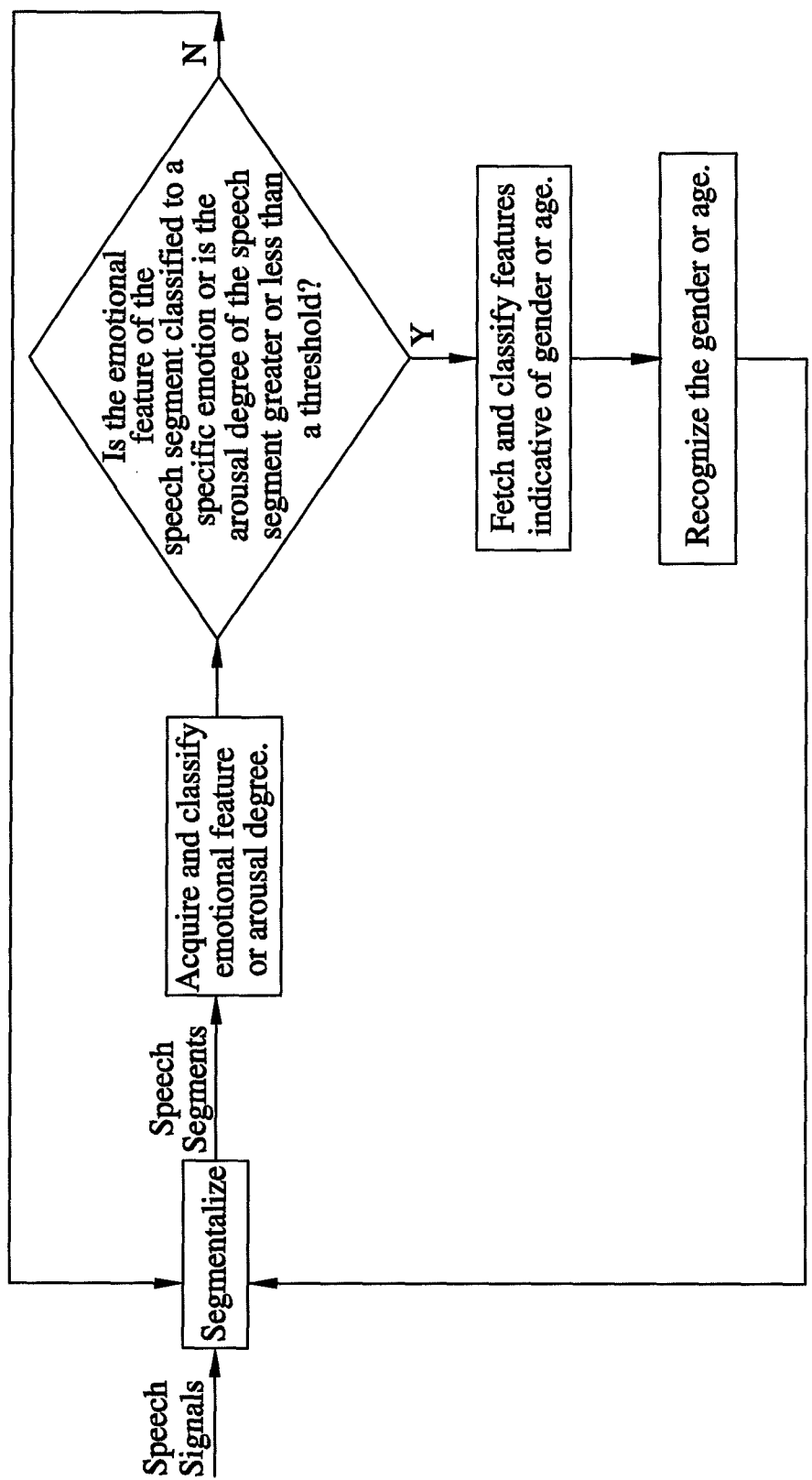
FIG. 1 is a flow chart of a preferred embodiment of the present invention.
Figure 2:
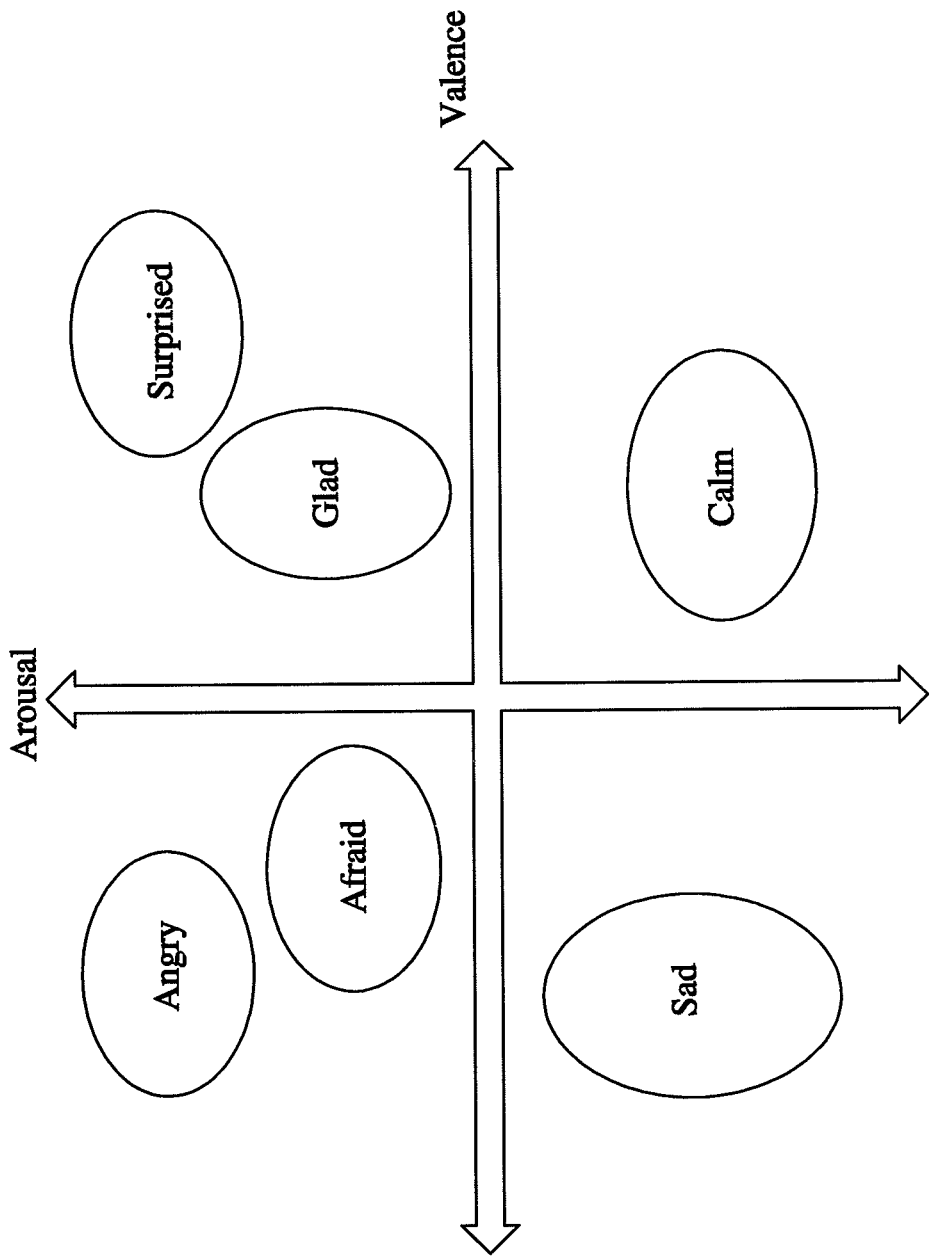
FIG. 2 is a schematic view of the preferred embodiment of the present invention, showing the classification of emotional features.
Figure 3:
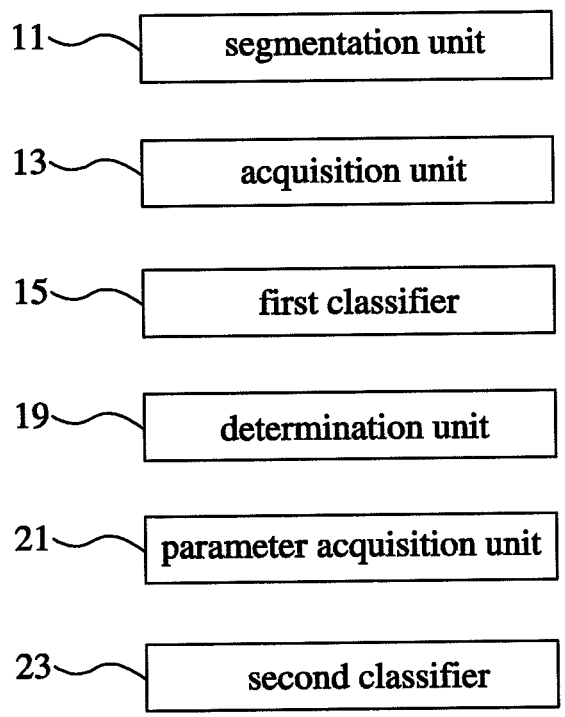
FIG. 3 is a schematic view of elements of the preferred embodiment of the present invention.

Referring to FIGS. 1-3, a method of recognizing gender or age of a speaker according to speech emotion or arousal in accordance with a preferred embodiment includes the following steps.

A) Segmentalize speech signals into a plurality of speech segments via a segmentation unit 11.

B) Fetch the first speech segment from the aforesaid speech segments via an acquisition unit 13 to further acquire at least one of emotional feature or arousal degree from the first speech segment. In this embodiment, both of the emotional feature and the arousal degree are acquired. Next, apply the first classification to the emotional feature and the arousal degree of the speech segment via a first classifier 15 to enable the emotional feature to be classified as a specific emotion and to enable the arousal degree to be classified as a high degree or a low degree of arousal. The specific emotion is the presentation of positive/negative emotion. The degree of arousal is the presentation of degree of the excitement. As shown in FIG. 2, speech signals can be classified as six common emotions: angry, glad, surprised, afraid, calm, and sad. In FIG. 2, Y-axis denotes degree of arousal and X-axis denotes degree of valence; different moods may present different degrees of arousal and valence. Features fetched from the emotion or arousal are listed in Table 1, wherein the spectral centroid (SC), spectral spread (SS), zero crossing rate (ZCR), duration, and fundamental frequency (F0) are recited in the step D).

TABLE 1

| SPEECH FEATURES | PARAMETERS |
| --- | --- |
| Zero Crossing Rate | 1) Mean of ZCR |
|  | 2) Standard deviation of ZCR |
| Spectral Centroid | 3) Mean of SC |
|  | 4) Standard deviation of SC |
| Spectral spread | 5) Standard deviation of SS |
| Duration | 6) Mean of duration |
|  | 7) Standard deviation of duration |
| Energy | 8) Mean of energy |
|  | 9) Standard deviation of energy |
| Fundamental Frequency | 10) Mean of F0 |
|  | 11) Standard deviation of F0 |

C) Via a determination unit 19, determine whether the emotional feature(s) of the speech segment belong(s) to a specific emotion and determine whether the arousal degree of the speech segment is greater or less than a specific threshold; if one or both of the answers are yes, proceed to the step D); if none of the answers is yes, return to the step B) and then fetch the next speech segment.

D) Fetch features indicative of gender or age from the speech segment via a parameter acquisition unit 21 to further acquire at least one feature parameter corresponding to the gender or age. Next, apply the second classification to the at least one feature parameter, which is the time-domain or frequency-domain parameter, via a second classifier 23. Whether the at least one feature parameter is suitable for classification or not in the time domain or frequency domain is determined by whether it is greater than a specific mean or a specific standard deviation, which indicates the mean or the standard deviation of the feature parameters sampled from multiple speakers.

In this embodiment, the at least one feature parameter is one of SC, SS, ZCR, duration, fast Fourier transformation (FFT) coefficients, jitter, and F0. When multiple feature parameters are considered, each of the feature parameters is one of SC, SS, ZCR, duration, FFT coefficients, jitter, and F0 and they are different from each other. ZCR and duration belong to the time-domain parameters and the SC, SS, FFT coefficients, jitter, and F0 belong to frequency-domain parameters. Besides, SC, SS, ZCR, duration, FFT coefficients, and jitter are adopted for age recognition; F0 and FFT coefficients are employed for gender recognition.

SC is a centroid of a spectrum after Fourier transformation, and a ratio of the sum of each frequency point multiplied by its power function to the sum of the power function. As the ratio is larger, the proportion of the high-frequency components becomes higher. How SC is calculated is set forth below:

$$SC = \frac{\sum_{k=1}^{N} \log_2\left(\frac{f(k)}{1000}\right) p(k)}{\sum_{k=1}^{N} p(k)} \quad (1)$$

where p(k) denotes the power at the k-th frequency point and f(k) is the value of the k-th frequency point after the Fourier transformation.

SS is the power multiplied by the difference between each frequency band in a speech frame and the SC, and then divided by the sum of power function as set forth in the following equation (2):

$$SS = \sqrt{\frac{\sum_{k=1}^{N}\left[\log_2\left(\frac{f(k)}{1000}\right) - SC\right] p(k)}{\sum_{k=1}^{N} p(k)}} \quad (2)$$

ZCR indicates the number of times that speech signals in each speech frame cross over the zero point. Generally speaking, ZCR of a noise frame (unvoiced frame) is greater than that of a voiced frame. How ZCR is calculated is set forth in the following equation (3):

$$Z_n = \frac{1}{2} \sum_{i=1}^{n} |\text{sgn}[x(m)] - \text{sgn}[x(m-1)]| \quad (3)$$

where sgn( ) is a sign function and x(m) is an input signal.

Duration indicates the density of speaking speed between syllables in the time domain and can also be regarded as the interval between neighboring high-energy speech frames. If the energy of the speech frame exceeds a threshold, THR, it will be deemed as the high-energy speech frame. How the threshold, THR, is calculated is shown in the following equation (4):

$$THR = \frac{1}{4}(A_{max} - A_{min}) + A_{min} \quad (4)$$

where $A_{max}$ is the speech frame having the highest energy in a speech segment and $A_{min}$ is the speech frame having the lowest energy in a speech segment.

FFT coefficients indicate the intensity distribution of speech signals at the frequency domain and can be calculated as follows:

$$y_j = \sum_{k=0}^{n-1} e^{\frac{2\pi}{n} jk} x_k \quad (5)$$

where j=0, 1, . . . , n−1.

Jitter indicates the ratio of difference between pitches at two adjacent speech frames to sum of pitches of all speech frames and can be calculated as follows:

$$\text{Jitter} = \frac{T_i - T_{i+1}}{\frac{1}{N}\sum_{i=1}^{N} T_i} \quad (6)$$

F0 is to reflect the fundamental frequency of speech signals for distinguishing the speech signals between male and female.

As for the aforesaid age-feature acquisition, the sketched features are listed in Table 2 as follows.

| SPEECH FEATURES | PARAMETERS |
|---|---|
| SC | 1) Mean of SC |
|  | 2) Standard deviation of SC |
| SS | 3) Standard deviation of SS |
| ZCR | 4) Mean of ZCR |
|  | 5) Standard deviation of ZCR |
|  | 6) Peak mean of ZCR |
|  | 7) Peak value of standard deviation of ZCR |
| Duration | 8) Mean of duration |
|  | 9) Standard deviation of duration |
| FFT Coefficients | 10) Mean of FFT coefficients |
|  | 11) Standard deviation of FFT coefficients |
| Jitter | 12) Mean of jitter |
|  | 13) Standard deviation of F0 |

As for the aforesaid gender-feature acquisition, the sketched features are listed in Table 3 as follows.

TABLE 3

| SPEECH FEATURES | PARAMETERS |
|---|---|
| F0 | 1) Mean of F0 |
| FFT Coefficients | 2) Standard deviation of FFT coefficients |

E) Apply recognition to the at least one feature parameter by a gender or age recognition measure to further determine the gender or age of the speaker based on the currently-processed speech segment. Next, apply the step B) to the next speech segment. The gender or age recognition measure is based on the at least one feature parameter in the time domain or frequency domain and then to determine the gender or age of the speaker according to the at least one feature parameter. When multiple feature parameters are considered, combine the feature parameters and then proceed to the gender or age recognition of the speaker.

The aforesaid steps A)-E) are executed in a computer. Beside, the segmentation unit 11, the acquisition unit 13, the first classifier 15, the determination unit 19, the parameter acquisition unit 21, and the second classifier 23 are the programs executable in the computer, so only their names and reference numerals are listed in FIG. 3.

When a person speaks under different moods, the characteristics of his or her voices vary with the mood, so the present invention can recognize the gender or age of the speaker according to the aforesaid steps and in view of the emotions in speech signals auxiliary.

It is to be noted that in the aforesaid embodiment, the emotional feature and the arousal degree are fetched in the step B) and the emotional feature and the arousal degree are determined in the step C). In other words, the acquisition in the step B) and the determination in the step C) proceed under the circumstances that both of the emotional feature and the arousal degree are available.

However, the emotional feature and the arousal degree can be taken alternatively. In other words, only the emotional feature is fetched in the step B) and determined in the step C) without the arousal degree; or, only the arousal degree is fetched in the step B) and determined in the step C) without the emotional feature. Such alternative can also reach the effect of recognizing the gender or age of a speaker in view of speech emotion or arousal degree. However, the condition for determination is only one, so the accuracy of the determination is less than that of the aforesaid embodiment.

Although the present invention has been described with respect to a specific preferred embodiment thereof, it is in no way limited to the specifics of the illustrated structures but changes and modifications may be made within the scope of the appended claims.

What is claimed is:

1. A method of recognizing gender or age of a speaker according to speech emotion or arousal, comprising steps of:
   A) segmentalizing speech signals into a plurality of speech segments;
   B) fetching the first speech segment from the speech segments to further acquire an arousal degree of the speech segment;
   B-1) after the first speech segment is fetched from the speech segments, applying a first classification to the arousal degree of the speech segment to enable the arousal to be classified as a high degree or a low degree of arousal;
   C) if a determination condition is set at a greater-than-threshold condition, proceeding the step D) when the arousal degree of the speech segment is determined greater than the specific threshold, or returning to the step B) when the arousal degree of the speech segment is determined less than or equal to the specific threshold; and
   if the determination condition is set at a less-than-threshold condition, proceeding to step D) when the arousal degree of the speech segment is determined less than the specific threshold, or returning to the step B) when the arousal degree of the speech segment is determined greater than or equal to the specific threshold;
   D) fetching a feature indicative of gender or age from the speech segment to further acquire at least one feature parameter corresponding to gender or age; and
   E) applying recognition to the at least one feature parameter according to a gender or age recognition measure to further determine the gender or age of the speaker in the currently-processed speech segment; next, apply the step B) to the next speech segment, wherein
   the steps A)-E) are executed by a computer.

2. The method as defined in claim 1, wherein speech signals in the step A) is segmentalized by a segmentation unit.

3. The method as defined in claim 1, wherein in the step B), the first speech segment is fetched by a first acquisition unit and the first classification is done via a first classifier.

4. The method as defined in claim 1, wherein in the step C), the arousal is the presentation of degree of the excitement.

5. The method as defined in claim 1, wherein in the step C), whether the arousal degree of the speech segment is greater or less than a specific threshold is determined by a determination unit.

6. The method as defined in claim 1, wherein in the step D), after at least one feature parameter is acquired, apply a second classification to the at least one feature parameter.

7. The method as defined in claim 6, wherein in the step D), the at least one feature parameter is fetched via a parameter acquisition unit and the second classification is done via a second classifier.

8. The method as defined in claim 6 wherein in the step E), the gender or age recognition measure is based on the at least one feature parameter and then to determine the gender or age of the speaker according to the at least one feature parameter.

9. The method as defined in claim 8, wherein in the step E), when multiple feature parameters are considered, the feature parameters are integrated and used to recognize the gender or age of the speaker.

10. The method as defined in claim 6, wherein in the step D), whether the at least one feature parameter is remarkable or not in time domain or frequency domain is determined by whether it is greater than a specific mean or a specific standard deviation, where the mean and standard deviation of the feature parameter are computed from speech signals of multiple speakers.

11. The method as defined in claim 1, wherein the at least one feature parameter is one of spectral centroid (SC), spectral spread (SS), zero crossing rate (ZCR), duration fast Fourier transformation (FFT) coefficients, jitter, and fundamental frequency (F0); when the at least one feature parameter is plural in number, each of the feature parameters is one of SC, SS, ZCR, FFT coefficients, jitter, and F0 and the feature parameters are different from each other.

12. The method as defined in claim 11, wherein SC, SS, FFT coefficients, jitter, and F0 belong to the frequency domain, and ZCR and duration belong to the time domain.

13. The method as defined in claim 11, wherein SC, SS, ZCR, duration, FFT coefficients, and jitter are adopted for age recognition; F0 and FFT coefficients are adopted for gender recognition.

* * * * *